(12) United States Patent
Tochi et al.

(10) Patent No.: US 7,806,701 B2
(45) Date of Patent: Oct. 5, 2010

(54) ELECTRONIC CARD HAVING A COUNTERMEASURE AGAINST STATIC ELECTRICITY

(75) Inventors: Akihiro Tochi, Kanagawa (JP); Masaki Tsujimoto, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 12/318,933

(22) Filed: Jan. 13, 2009

(65) Prior Publication Data

US 2009/0191757 A1 Jul. 30, 2009

(30) Foreign Application Priority Data

Jan. 30, 2008 (JP) .............................. 2008-019279

(51) Int. Cl.
*H01R 12/00* (2006.01)
(52) U.S. Cl. ............ 439/76.1; 439/607.22; 439/607.53; 439/946
(58) Field of Classification Search ............... 439/76.1, 439/946, 607.22, 607.53
See application file for complete search history.

(56) References Cited

U.S. PATENT DOCUMENTS

| | | | | |
|---|---|---|---|---|
| 5,413,490 | A | * | 5/1995 | Tan et al. .................... 439/76.1 |
| 5,490,043 | A | * | 2/1996 | Tan et al. .................... 439/946 |
| 5,529,503 | A | * | 6/1996 | Kerklaan ................... 439/76.1 |
| 5,547,397 | A | * | 8/1996 | Hirai ......................... 439/946 |
| 5,653,596 | A | * | 8/1997 | Banakis et al. ................ 439/64 |
| 5,839,907 | A | * | 11/1998 | Kuo ........................... 439/76.1 |
| 6,004,144 | A | * | 12/1999 | Yeh et al. .................... 439/76.1 |
| 6,181,564 | B1 | * | 1/2001 | Furusho ...................... 439/946 |

FOREIGN PATENT DOCUMENTS

| | | |
|---|---|---|
| JP | H06-059778 A | 3/1994 |
| JP | H07-192105 A | 7/1995 |
| JP | 2000-048159 A | 2/2000 |
| JP | 2001-022908 A | 1/2001 |
| JP | 2001-209773 A | 8/2001 |
| JP | 2004-127230 A | 4/2004 |
| JP | 2004-171598 A | 6/2004 |
| JP | 2004-171599 A | 6/2004 |
| JP | 2005-327202 A | 11/2005 |
| JP | 2007-109198 A | 4/2007 |

\* cited by examiner

*Primary Examiner*—Tho D Ta
(74) *Attorney, Agent, or Firm*—Rader, Fishman & Grauer PLLC

(57) ABSTRACT

The electronic card of the present invention enables prevention of failure of an electronic circuit incorporated in the electronic card by establishing an electrostatic shielding unit. A connector has a plurality of contacts and a housing. A container case has a side facing a face of one side of the substrate on which an electronic circuit is imprinted, and a first shell and a second shell of electrically conductive material positioned on a side facing the face of the other side of the substrate, respectively. An opening is established on a front end section relating to insertion and removal of the connector in a housing, and is held in a state in which contacts are exposed internally. An electrostatic shielding unit is of electrically conductive material that is electrically connected to the container case, and is positioned in an exposed state on a surface of the above-mentioned front end section.

8 Claims, 8 Drawing Sheets

ELECTRONIC CARD HAVING A COUNTERMEASURE AGAINST STATIC ELECTRICITY

The present application asserts the benefits of the priority rights based on Japanese Patent Application No. 2008-019279, submitted on Jan. 30, 2008, and the contents of the application are incorporated herein by way of reference.

BACKGROUND OF THE INVENTION

1. Field of the Invention

The present invention relates to a small-sized electronic card, such as a CF card or an Express card. In particular, it is related to electronic cards to which an electrostatic countermeasure has been applied.

2. Related Art

In recent years, among such small-sized electronic cards such as CF cards or Express cards, there are those in which ICs (Integrated Circuits) have been mounted on substrates thereof for storing information (data) or performing computations. In addition, such electronic cards are being widely used as storage media or as devices and the like for adding various functions, in various electronic apparatuses such as personal computers, digital cameras, or the like.

Incidentally, the above-mentioned electronic cards usually have positioned internally therein a substrate incorporating electronic circuits, while having contacts, which are connected to the electronic circuits, which are formed to be connectable to external apparatuses. As a result, for example, if a user using an electronic card that is charged with static electricity, then if the user comes into contact with the electronic card, or approaches the electronic card, there are cases where a discharge of static electricity from the user toward a contact may occur. Such a discharge of static electricity carries the danger of significantly affecting electronic circuits, such as causing damage to the electronic circuit connected to the contact.

As a countermeasure for the above, there is a technology for forming a container case containing a substrate that incorporates an electronic circuit with such conductive materials as a metal plate and the like. For example, the electronic card disclosed in Japanese Unexamined Patent Application Publication No. 2000-48159 is configured such that, in a case in which a user or the like who has an electrostatic buildup approaches the electronic card, and static electricity or the like is discharged from the user to the electronic card, static electricity is actively made to be discharged to the container case. This kind of electronic card is designed so that, by way of actively causing static electricity and the like to be discharged to a container case that does not conduct electricity to the electronic circuit incorporated in the substrate, electronic circuits in the electronic card are not affected by the static electricity.

SUMMARY OF THE INVENTION

However, for the electronic card described in Japanese Unexamined Patent Application Publication No. 2000-48159, there were cases where: if a contact was held by a housing in a state exposed in an interior of an opening of the housing, for example, when a person electrostatically charged with static electricity or the like tried to touch the housing of the electronic card, if the distance from the electrostatically charged person to the contact was closer than the distance from the electrostatically charged person to the container case of the electronic card, the static electricity would not discharge to the side of the container case of the electronic card, but would discharge to the contact. As a result, there was the problem of a risk of damaging an electronic circuit or the like connected to the contact.

The present invention was made in view of the above-mentioned issue, with the objective of providing an electronic card capable of preventing damage to an electronic circuit incorporated in an electronic card, by way of effectively causing, discharge of static electricity directed towards the card.

The electronic card of the present invention establishes an electrostatic shielding unit that is formed by conductive materials on a surface of a housing in a vicinity of a contact, so as to configure a distance from an electrostatically charged person to an electrostatic shielding unit to be shorter than a distance from the electrostatically charged person to the contact. More specifically, the following kind of electronic card is provided.

The electronic card related to an embodiment of the present invention is an electronic card having a plurality of contacts; connectors having a housing holding the contacts; a substrate, connected to the contacts, and incorporating an electronic circuit therein; and a container case having a first shell and a second shell of conductive material that are respectively positioned on at least one of a side facing a face of one side of the substrate and a side facing a face of another side of the substrate; in which the electronic card includes: an opening established on a front end section relating to insertion and removal of the connector with the housing, in which the contacts are held in an exposed state internally; and an electrostatic shielding unit of electrically conductive material electrically connected to the container case, positioned in a state exposed on a surface of the front end section.

As a configuration of the electrostatic shielding unit, one portion of either one or both of the first shell and the second shell are processed by bending. Alternatively, the electrostatic shielding unit is formed integrally together with the first shell and the second shell. Yet alternatively, the electrostatic shielding unit is a plate portion covering a perimeter of the opening. This plate portion can be made so that the first shell and the second shell are established as separate bodies.

It should be noted that, as a configuration of the container case, it is possible to have a frame in addition to the first shell and the second shell. The frame is formed of an insulating material and positioned on a side opposite a side on which the connector is positioned so as to sandwich the substrate therebetween by the connector.

Furthermore, the electronic circuit is preferably a memory card composed of a memory IC.

DETAILED DESCRIPTION OF THE INVENTION

The present invention establishes an electrostatic shielding unit that is formed by an electrically conductive material on a surface of a housing in a contact vicinity, and is configured so that a distance between an electrostatically charged person and an electrostatic shielding unit is shorter than a distance between the electrostatically charged person and the contact. As a result, an electronic card is provided in which, in a case where an electrostatically charged person approaches the vicinity of the contacts, static electricity is discharged to the electrostatic shielding unit.

Hereinafter, an embodiment of the present invention is explained with reference to the drawings. It should be noted that the embodiment of the present invention is not limited in any way to the following embodiment, and the technical scope thereof is not limited hereto. Furthermore, in the present embodiment, a CFast card as an electronic card is used in the description; however, the present invention is not limited thereto. For example, a PC card such as an express card may be used as well.

Figure 1:
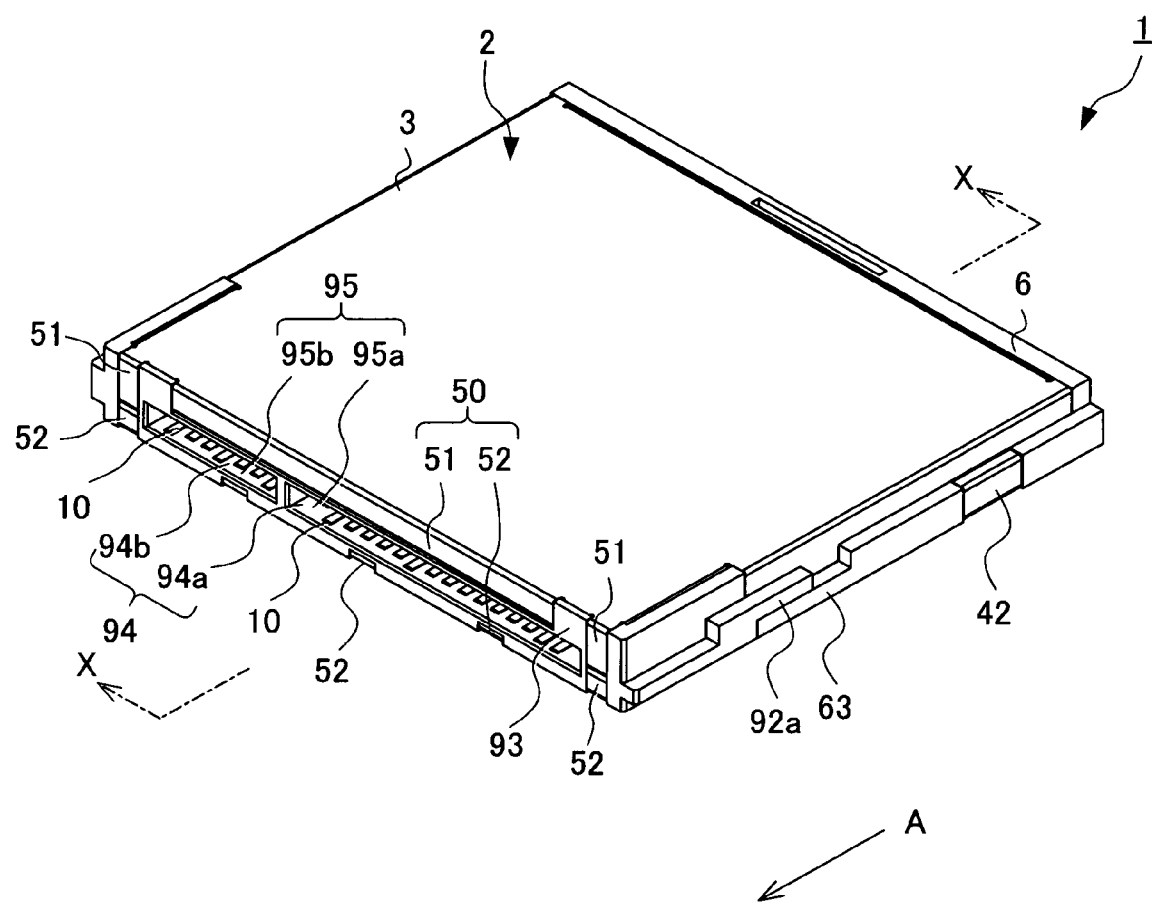
FIG. 1 is a perspective view seen from an upper side of a CFast card according to a first embodiment of the present invention.
Figure 2:
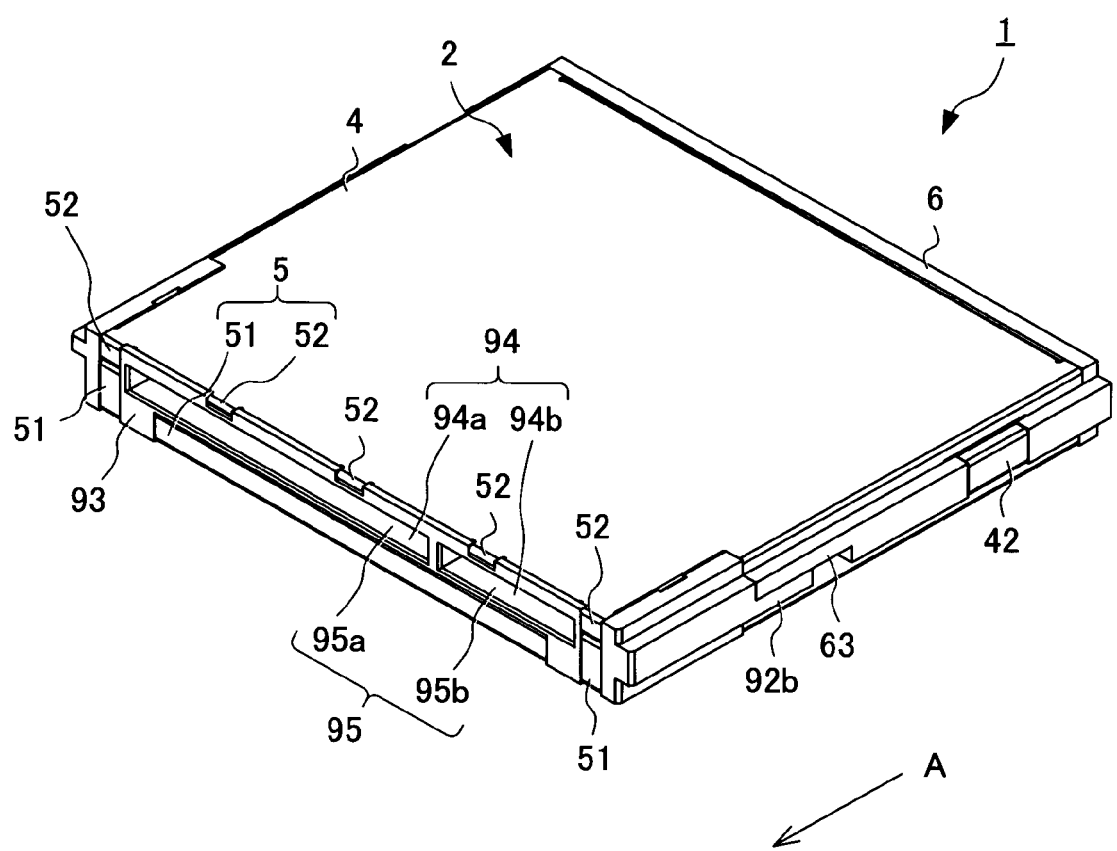
FIG. 2 is a perspective view seen from a lower side of a CFast card according to the embodiment.
Figure 3:
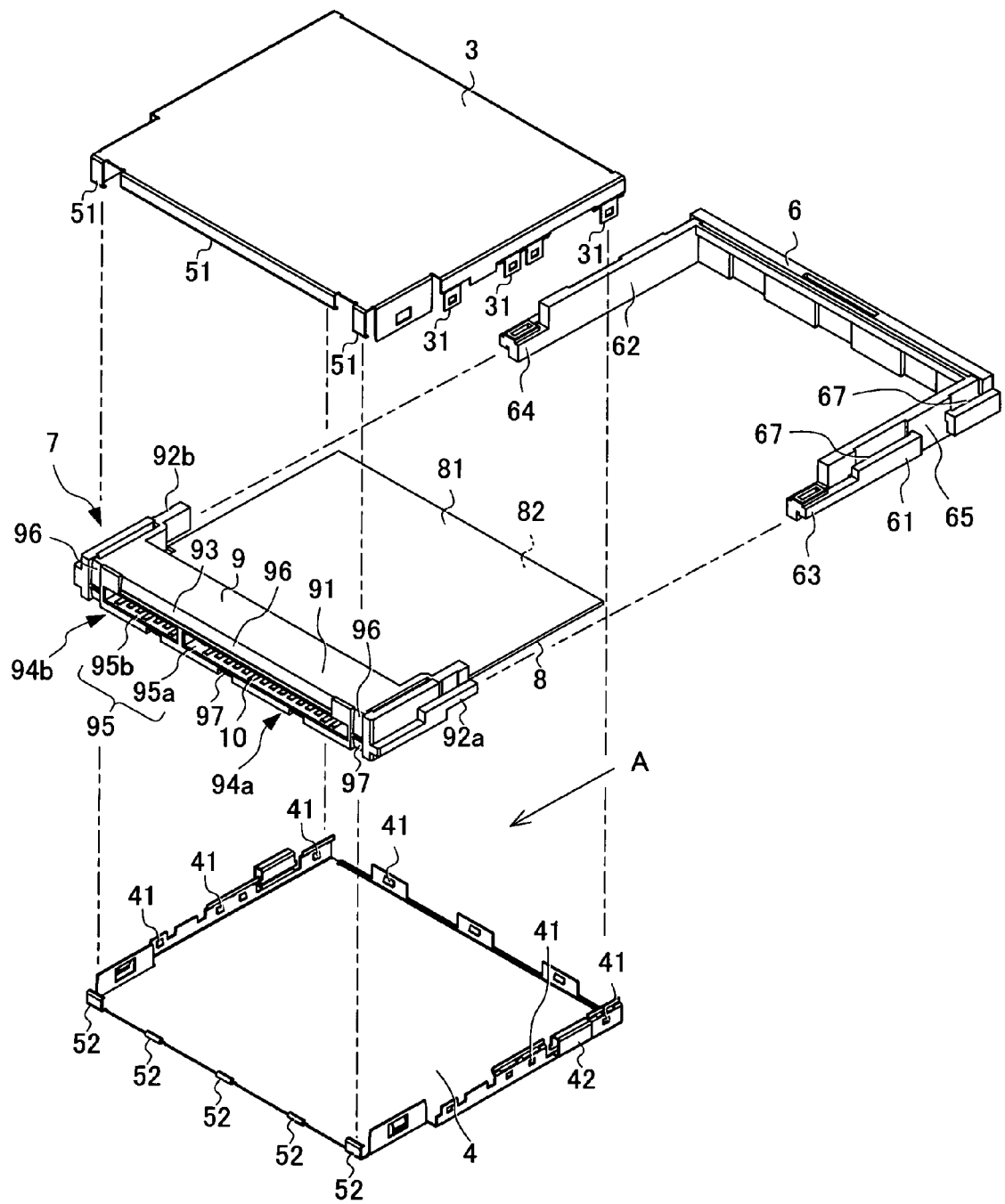
FIG. 3 is an exploded perspective view of the CFast card according to the embodiment.
Figure 4:
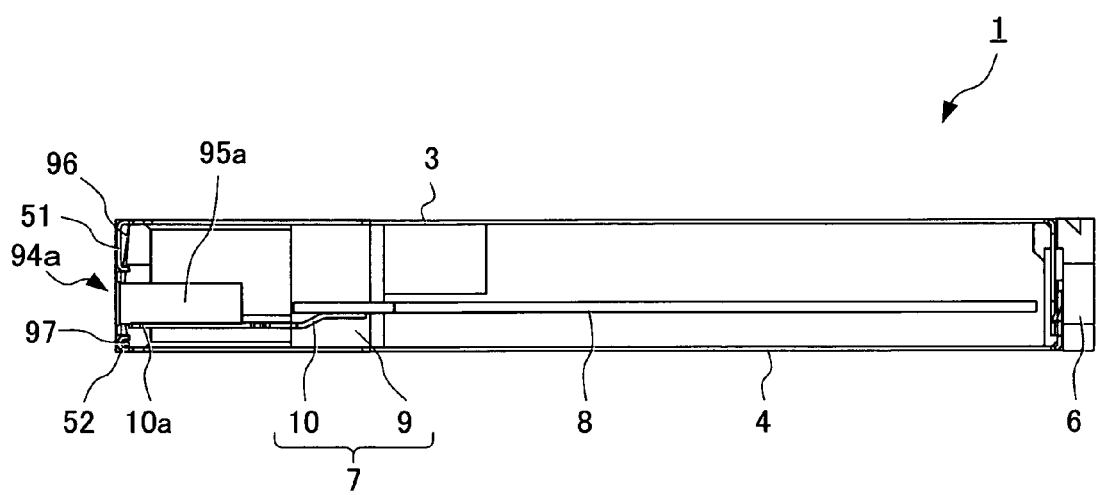
FIG. 4 is a cross-sectional view along the A-A line of FIG. 1.

FIG. 1 is a perspective view seen from an upper side of a CFast card 1 according to a first embodiment of the present invention. FIG. 2 is a perspective view seen from a lower side of a CFast card 1 according to the embodiment. FIG. 3 is an exploded perspective view of the CFast card 1 according to the embodiment. FIG. 4 is a cross-sectional view along the A-A line of FIG. 1.

First Embodiment

A CFast card 1 according to a first embodiment, as shown in FIGS. 1 to 3, is a card-type storage medium formed in a rectangular shape, for example, mounted in a slot established in an external apparatus of a personal computer and the like, and is used by way of fitting into a connector established in an interior of the external apparatus. Hereinafter, the CFast card 1 is described in detail.

The CFast card 1 is configured with a container case 2 that contains a printed substrate 8, the printed substrate 8 incorporating a memory IC (not illustrated) configuring memory, and a connector 7 that is connected to the printed substrate 8, as main components.

The container case 2 is configured with a top shell 3, which is a first shell that is positioned on a side facing a face 81 of one side of the printed substrate 8; a bottom shell 4, which is a second shell that is positioned on a side facing a face 82 of another side of the printed substrate 8; an electrostatic shielding unit 5 that is formed by way of processing by bending the top shell 3 and bottom shell 4; and a frame 6 positioned on a side opposite a side on which a connector 7 is positioned, so as to sandwich the printed substrate 8 therebetween by the connector 7, in a mounting direction (A) of the connector 7, as main components.

The top shell 3 is formed in a substantially rectangular shape by a metallic material which is an electrically conductive material. Furthermore, in the top shell 3, fitting hole portions 31 having hole portions formed so as to be capable of fitting with the bottom shell 4 are established on both sides perpendicular to the mounting direction (A) of the connector 7, and on a rear end section in the mounting direction (A) of the connector 7. After forming a portion of the top shell 3 in a prescribed form, the fitting hole portions 31 are formed by way of processing by bending in a direction toward the bottom shell 4 side.

The bottom shell 4 is formed in a substantially rectangular shape by a metallic material which is an electrically conductive material. Furthermore, on the bottom shell 4, fitting claw portions 41 having claw portions capable of fitting with the hole portions of the fitting hole portions 31 formed on the top shell 3 are established on both sides perpendicular to the mounting direction (A) of the connector 7, and on a rear end section in the mounting direction (A) of the connector 7. After forming a portion of the bottom shell 4 in a prescribed shape, the fitting claw portions 41 are formed by way of processing by bending thereof to the top shell 3 side.

In order to form the container case 2, the bottom shell 4 and the top shell 3 are formed in a plate shape capable of containing the printed substrate 8 in an interior thereof, by way of fitting the claw portions of the fitting claw portions 41 into the hole portions of the fitting hole portions 31.

Furthermore, a grounding portion 42 is established in the bottom shell 4. The grounding portion 42 is connected to a grounding portion to be ground established in a connector of the external apparatus in a case of being mounted to the external apparatus that is to be used, and is configured so as to dissipate an electrical charge built up in the top shell 3 and the bottom shell 4. It should be noted that, after forming a portion of the bottom shell 4 into a predetermined shape, the grounding portion 42 in the present embodiment is formed by way of processing by bending thereof to the top shell 3 side, and is formed to be capable of elastic deformation.

The electrostatic shielding unit 5 is established on a mounting direction (A) front edge portion side of the connector 7 in the top shell 3 and the bottom shell 4, that is to say, on a front end section relating to insertion and removal of the connector 7. More specifically, as shown in FIGS. 3 and 4, after forming into a prescribed form, a first shield unit 51 processed by bending to a bottom shell 4 side is established on a front edge portion side on the top shell 3. Similarly, on the bottom shell 4, a second shield unit 52 processed by bending to a top shell 3 side is established on the front edge portion side after having been formed into a prescribed form. It should be noted that, in the present embodiment, in the top shell 3, three first shield units 51 are established, and in the bottom shell 4, five second shield units 52 are established.

The frame 6 has a pair of arm regions 61 and 62 positioned so as to pinch both sides of the print substrate in a direction perpendicular to the mounting direction (A) of the connector 7, and is formed substantially in the shape of a square with one side missing. Additionally, on each tip of the pair of arm regions 61 and 62, first catching portions 92a and 92b established on a connector 7 described later and engageable second catching portions 63 and 64 are formed. Furthermore, on each of the pair of arm regions 61 and 62 are established first concave portions 65, which are concaved in a direction of thickness of the arm regions.

By engaging the below described first catching portions 92a and 92b established on the connector 7, and the second catching portions 63 and 64 established on the tips of the arm regions 61 and 62, the frame 6 configures a border body that surrounds the side edges of the printed substrate 8. Moreover, the frame 6 is formed of a synthetic resin which is an insulating material, and thus the printed substrate 8 is in a state where the peripheral border thereof is enclosed by an insulating material.

Furthermore, in the frame 6, a plurality of slits 67 are established in order to maintain the fit of the fitting hole portions 31 of the top shell 3 and the fitting claw portions 41 of the bottom shell 4. The fitting hole portions 31 and the fitting claw portions 41 are each fit into that which corresponds thereto in an interior of the slits 67 established on the frame 6, thereby maintaining the fitting hole portions 31 and fitting claw portions 41, which are fit into a fit state, in the interior of the slits 67.

The print substrate 8 is equipped with a memory IC (Integrated Circuit) that includes memory not illustrated. The CFast card 1 functions as a storage medium by way of equipping a memory IC. Furthermore, aside from the memory IC configuring the memory, a ground contact portion (not illustrated) that dissipates an electrical charge of static electricity and the like is established on the printed substrate 8.

The connector 7 is configured with a housing 9 formed of a synthetic resin that is an insulating material, and a plurality of contacts 10 connected to the memory IC having one end side thereof mounted on the printed substrate 8, as main components. The housing 9 has a housing main body 91 formed in a substantially rectangular solid that holds each of the plurality of contacts 10, and first catching parts 92a and 92b protruding, at both ends with regards to a longitudinal direction of the housing main body, in a direction opposite to a side of a mounting direction (A) of a connector 7. It should be noted that the first catching portions 92a and 92b are formed so as to be engageable with the second catching portions 63 and 64.

An opening 94, which is divided into a first opening 94a and a second opening 94b, is established in the housing main unit 91, on a front end section relating to insertion and removal of a connector, that is to say, on a first face 93 to be a front face in a mounting direction (A) of a connector 7. In addition, in an interior of the opening 94 is established a holding portion 95 held so as to expose contacts 10. More specifically, in an interior of the first opening 94a, a first holding portion 95a is established, and in an interior of the second opening 94b, a second holding portion 95b is established. In the first holding portion 95a and the second holding portion 95b, it is possible to separate and hold, per each function, contacts connected to an electronic circuit having prescribed functions. It should be noted that, in the present embodiment, the contacts 10 connected with the memory IC are held in a state in which tip portions 10a thereof are exposed in both the first holding portion 95a and the second holding portion 95b (see FIG. 4).

Furthermore, the housing main body 91 holds the printed substrate 8 on a side face facing the first face 93, while holding the contacts 10 connected to the printed substrate 8.

In addition, in the first face 93 are formed a first concave portion 96 in which the first shield unit 51 is positioned, and similarly, a second concave portion 97 in which the second shield unit 52 is positioned. By establishing the first concave portion 96 and the second concave portion 97 in the first face 93, and respectively positioning the first shield unit 51 and the second shield unit 52 in each, it becomes possible to position the first shield unit 51 and the second shield unit 52 in vicinities of the tip portions 10a of the contacts 10 (see FIG. 4).

In this way, according to the present embodiment, it becomes possible for the CFast card 1, by way of positioning the first shield unit 51 formed by way of processing by bending a protruding portion protruding from the top shell 3, and the second shield unit 52 formed by way of processing by bending a protruding portion protruding from the bottom shell 4, so as to protrude in a vicinity of the opening 94 in which the holding unit 95 holding the contacts 10 was established, to achieve the effect whereby, even in a case in which a discharge such as of static electricity occurred, the discharge would not reach the contacts, but would only reach the first shield unit 51 or the second shield unit 52.

That is to say, it is possible for the CFast card 1 to direct a discharge from the electrostatically charged person not to the contacts, but to the closer first shield unit 51 or the second shield unit 52, by way of positioning the first shield unit 51 and/or the second shield unit 52 so as to be exposed on the surface of the first face 93 which is a front end section in the mounting direction (A) of the connector 7, even in a case in which a user or the like charged with static electricity makes contact with a connector vicinity of the CFast card, since a distance between the electrostatically charged person and the first shield unit 51 and the second shield unit 52 is shorter than a distance between the electrostatically charged person and the contacts. As a result, it is possible to prevent discharge of static electricity and the like to the contacts, and it is possible to protect an electronic circuit connected to the contacts 10 from static electricity and the like.

Other Embodiments

Next, CFast cards 1A and 1B related to other embodiments of the present invention are explained. It should be noted that, in the following embodiment, portions not explained in particular are similar to those in the first embodiment, and for the numbers assigned in the figures, in a case of similarity to the first embodiment, identical numbers are assigned.

1. A Second Embodiment

Figure 5:
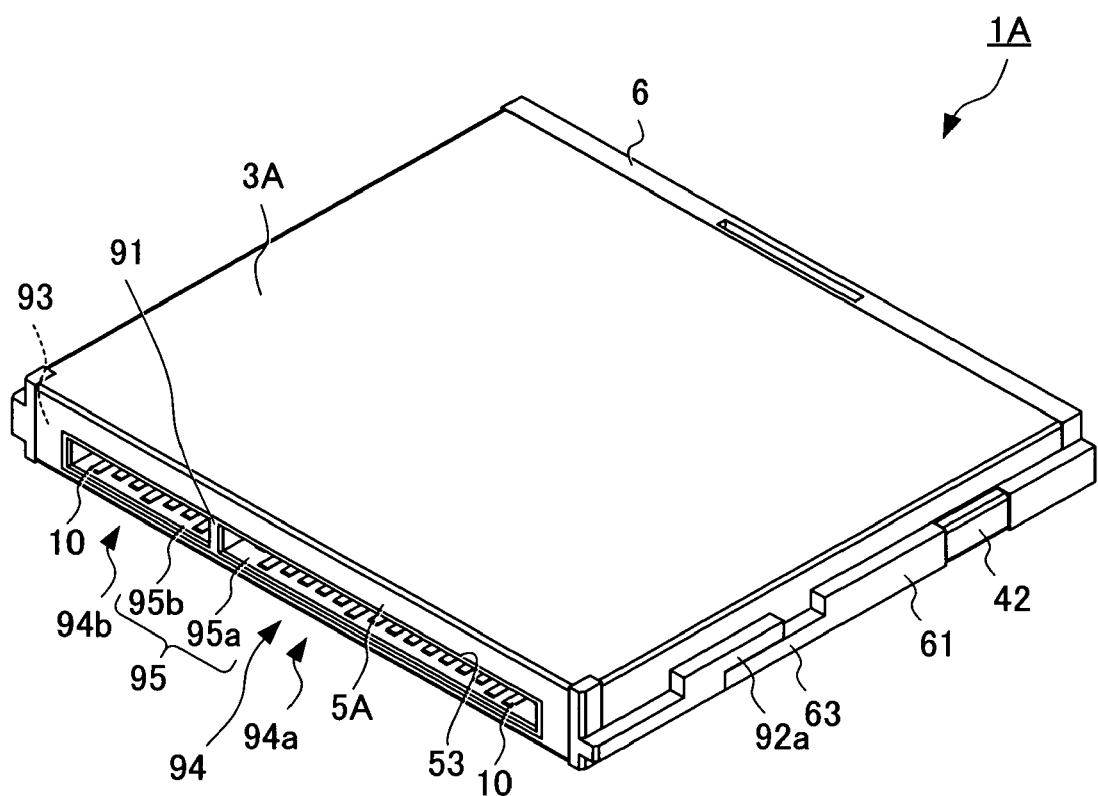
FIG. 5 is a perspective view seen from a front side of a CFast card according to a second embodiment of the present invention.
Figure 6:
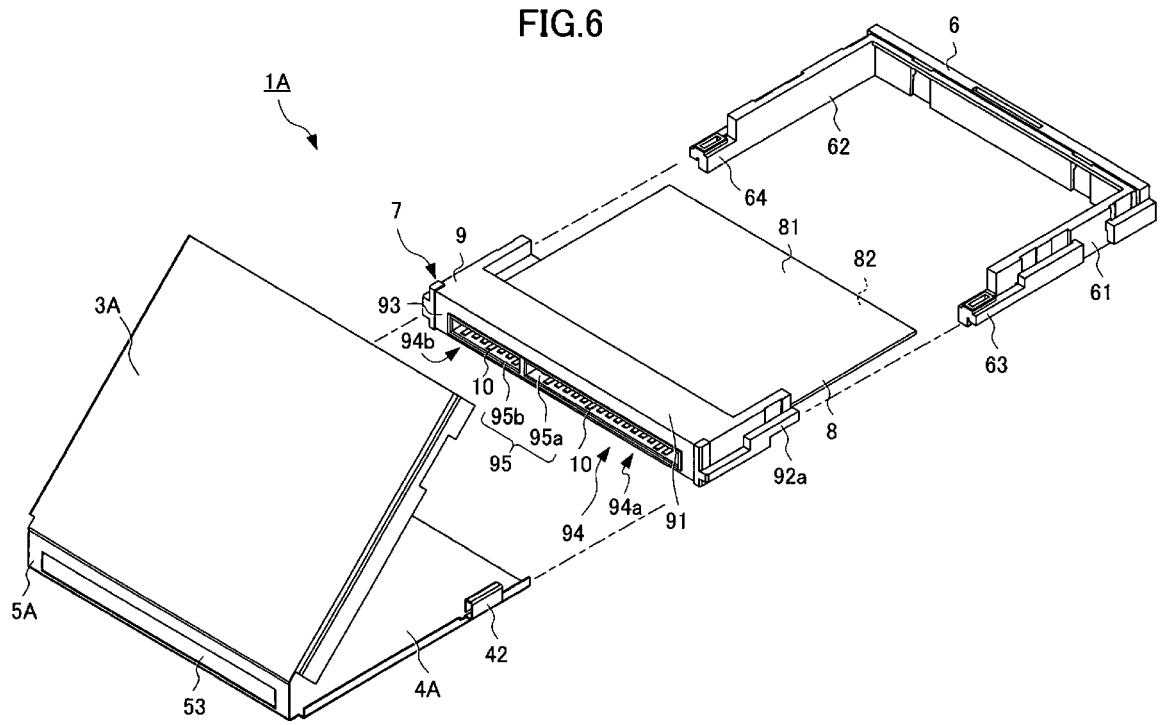
FIG. 6 is an exploded perspective view of the CFast card according to the embodiment.

FIG. 5 is a perspective view seen from a front side of a CFast card 1A according to a second embodiment of the present invention. FIG. 6 is an exploded perspective view of the CFast card 1A according to the embodiment.

As shown in FIGS. 5 and 6, the CFast card 1A in the second embodiment of the present invention differs from the first embodiment in that a top shell 3A, bottom shell 4A, and electrostatic shielding unit 5A for a container case 2A are formed integrally.

More specifically, the top shell 3A, the electrostatic shielding unit 5A, and the bottom shell 4A are consecutively formed in that order integrally, and the top shell 3A, the electrostatic shielding unit 5A, and the bottom shell 4A configure a container case by way of processing by bending joining sections of the top shell 3A and the electrostatic shielding unit 5A, and joining sections of the electrostatic shielding unit 5A and the bottom shell 4A, respectively.

As a result, it is possible for the CFast card 1A to cover an entire face of a first face with the electrostatic shielding unit 5A. It should be noted that an opening 53 is established in the electrostatic shielding unit 5A, and as a result, it becomes possible to be communicated with an opening 94 established on a housing main body 91, and exposure of a holding unit 95, in other words, exposure of the contacts 10, is maintained.

In this manner, according to the second embodiment, because an electrostatic shielding unit 5A, which is formed by an electrically conductive material in an entire face except for the opening 94 in a first face 93 of the housing main body 91, is arranged, it is possible for the CFast card 1A to improve a shielding effect against static electricity and the like.

Furthermore, according to the second embodiment, since the CFast card 1A has the top shell 3A, the bottom shell 4A, and the static shield unit 5A formed integrally, it is possible to improve the strength of the CFast card 1A.

In addition, according to the second embodiment, since the top shell 3A, the bottom shell 4A, and the static shield unit 5A are formed integrally, it is possible for the CFast card 1A to reduce a number of constitutional components thereof. As a result, it is possible to decrease a number of man-hours required for assembly.

2. A Third Embodiment

Figure 7:
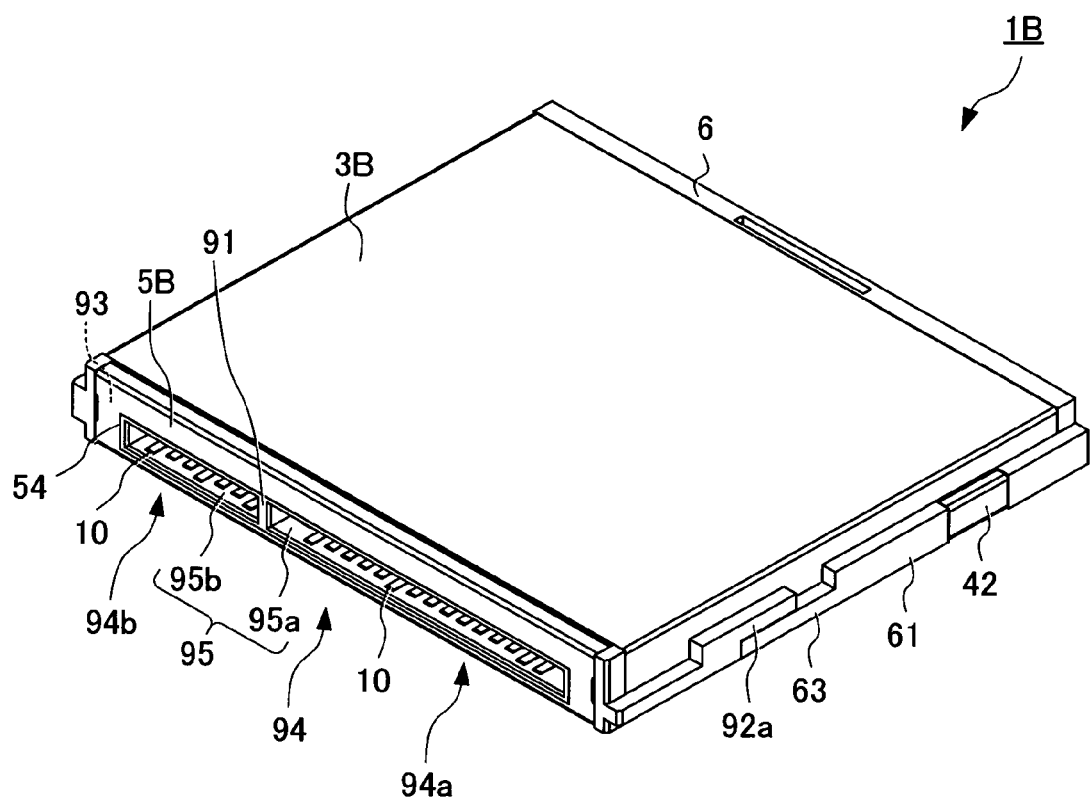
FIG. 7 is a perspective view seen from a front side of a CFast card according to a third embodiment of the present invention.
Figure 8:
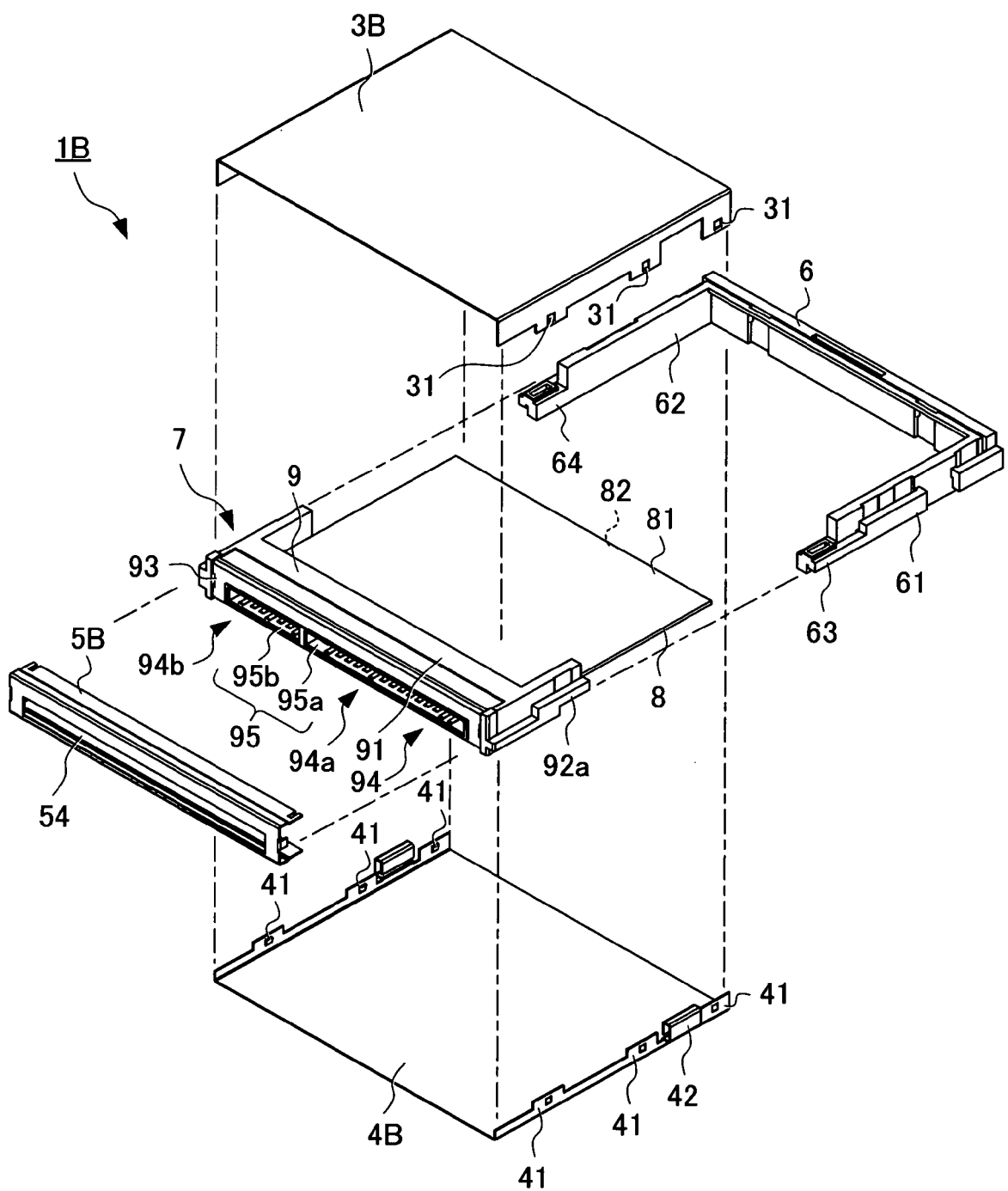
FIG. 8 is an exploded perspective view of the CFast card according to the embodiment.

FIG. 7 is a perspective view seen from a front side of a CFast card 1B according to a third embodiment of the present invention. FIG. 8 is an exploded perspective view of the CFast card 1B according to the embodiment.

As shown in FIGS. 7 and 8, the CFast card 1B according to the third embodiment of the present invention differs from the first embodiment in that a grounding plate 5B is established that is a plate portion on a first face 93 of a connector 7.

More specifically, the CFast card 1B differs from the first embodiment in establishing a grounding plate 5B formed of electrically conductive material to be a separate body from a top shell 3B and a bottom shell 4B, instead of establishing an electrostatic shielding unit 5 extending from the top shell 3B and the bottom shell 4B.

It should be noted that it is possible to dissipate an electrical charge built up in the grounding plate 5B to the top shell 3B and the bottom shell 4B by way of having the grounding plate 5B established so as to be abutting each of the top shell 3B and the bottom shell 4B. As a result, it is possible for the grounding plate 5B to dissipate an electrical charge to an external apparatus at a time of mounting to the external apparatus.

Furthermore, an opening 54 is established on the grounding plate 5B and, as a result, it is possible to be communicated with an opening 94 established in a housing main body 91, and exposure of the contacts 10 is preserved.

In this manner, according to the third embodiment, because the grounding plate 5B is established as a separate body from the top shell 3B and the bottom shell 4B, it is easy to exchange the CFast card 1B even in a case of failure. In addition, since the grounding plate 5B is established on a front face of a connector 7, it is possible for the CFast card 1B to increase strength against bending, deformation, and the like of the connector 7.

Moreover, according to the third embodiment, since the grounding plate 5B, formed by an electrically conductive material, is arranged to be an entire face except for an opening 94 on a first face 93 of a housing main body 91, it is possible for the CFast card 1B to increase a shielding effect against static electricity and the like.

It should be noted that, in the embodiment, although an electronic card has been described using a CFast card to which a memory IC is equipped, the present invention is not limited thereto. For example, equipping an IC for performing calculation or an IC for performing communication is acceptable as well. For example, a CPU-equipped card that is equipped with a CPU, a coprocessor or the like is acceptable as well.

Furthermore, there is no limitation to a CFast card as an electronic card and, for example, even in a case of an Express card or a SIM card, it is acceptable to configure thereof by establishing an electrostatic shielding unit according to the present invention, and to cause a distance between an electrostatically charged person and the electrostatic shielding unit be shorter than a distance between the electrostatically charged person and a contact, thereby anticipating the operational effects of the present invention for any IC card.

What is claimed is:
1. An electronic card comprising:
   a connector having a plurality of contacts and a housing that holds the contacts;
   a substrate that is connected to the contacts and an electronic circuit mounted thereon; and
   a container case having:
      a first shell formed of an electrically conductive material and disposed on a face facing a surface on a first side of the substrate, and
      a second shell formed of an electrically conductive material and disposed on a face facing a surface on a second side of the substrate,
   wherein the electronic card includes:
   an opening provided on a front end section relating to insertion and removal of the connector with the housing, wherein the contacts are held in an internally exposed state;
   an electrostatic shielding unit of electrically conductive material that is electrically connected to the container case, and disposed in an exposed state on a surface of the front end section; and
   a grounding portion established on an outer surface of the container case for external connection, and configured so as to dissipate an electrical charge built up in the first shell and the second shell,
   wherein the grounding portion is formed to be capable of elastic deformation by forming a portion of the second shell into a U-shaped portion formed by way of processing by bending the portion of the second shell to the first shell side.

2. The electronic card according to claim 1, wherein the electrostatic shielding unit is formed by way of processing by bending one portion of at least one of the first shell and the second shell.

3. The electronic card according to claim 1, wherein the first shell, the second shell, and the electrostatic shielding unit are formed integrally.

4. The electronic card according to claim 1, wherein the electronic card is a memory card comprising a memory IC.

5. The electronic card according to claim 1, wherein the electrostatic shielding unit is a plate part covering a perimeter of the opening.

6. The electronic card according to claim 5, wherein the plate part that is established to be a separate body from the first shell and the second shell.

7. An electronic card comprising:
   a connector that has a plurality of contacts and a housing holding the contacts;
   a substrate that is connected to the contacts and an electronic circuit equipped thereto; and
   a container case having:
      a first shell formed of an electrically conductive material and disposed on a side facing a face of a first side of the substrate,
      a second shell formed of an electrically conductive material and disposed on a side facing a face of a second side of the substrate, and
      a frame that is formed of an insulating material, and disposed on a side opposite to a side on which the connector is disposed, so as to sandwich the substrate therebetween by the connector,
   wherein the electronic card includes:
   an opening established on a front end face relating to insertion and removal of the connector with the housing, the contacts being held internally in an exposed state;
   an electrostatic shielding unit of electrically conductive material electrically connected to the container case, disposed in an exposed state on a surface of the front end section; and a grounding portion established on an outer surface of the container case for external connection, and configured so as to dissipate an electrical charge built up in the first shell and the second shell, wherein the grounding portion is formed to be capable of elastic deformation by forming a portion of the second shell into a U-shaped portion formed by way of processing by bending the portion of the second shell to the first shell side.

8. The electronic card according to claim 7, wherein the electronic card is a memory card comprising a memory IC.

* * * * *